(12) United States Patent
Vaisman et al.

(10) Patent No.: US 7,449,032 B2
(45) Date of Patent: Nov. 11, 2008

(54) METHOD OF MANUFACTURING SURFACE MOUNT CAPACITOR

(75) Inventors: Pavel Vaisman, Beer-Sheva (IL); Alex Eidelman, Beer-Sheva (IL); Yuri Stangrit, Beer-Sheva (IL); Leonid Vasserman, Arad (IL)

(73) Assignee: Vishay Sprague, Inc., Sanford, ME (US)

( * ) Notice: Subject to any disclaimer, the term of this patent is extended or adjusted under 35 U.S.C. 154(b) by 403 days.

(21) Appl. No.: 11/266,915

(22) Filed: Nov. 4, 2005

(65) Prior Publication Data

US 2006/0260109 A1    Nov. 23, 2006

Related U.S. Application Data

(62) Division of application No. 11/132,116, filed on May 17, 2005, now Pat. No. 7,161,797.

(51) Int. Cl.
*H01G 9/06* (2006.01)
*H01L 27/10* (2006.01)
(52) U.S. Cl. .............. 29/25.03; 29/25.41; 257/E27.071
(58) Field of Classification Search ........... 257/E27.071
See application file for complete search history.

(56) References Cited

U.S. PATENT DOCUMENTS

| 4,876,451 | A | * | 10/1989 | Ikeda et al. ................. 361/540 |
| 5,469,326 | A | | 11/1995 | Kanetake |
| 6,229,687 | B1 | | 5/2001 | Wada et al. |
| 6,238,444 | B1 | | 5/2001 | Cadwallader |
| 6,346,127 | B1 | | 2/2002 | Kuriyama |

(Continued)

FOREIGN PATENT DOCUMENTS

| EP | 1096520 A | 5/2001 |
| EP | 1143465 A | 10/2001 |
| EP | 1160809 A | 12/2001 |
| JP | 2002175939 A | * 6/2002 |

OTHER PUBLICATIONS

Yoshihiro Takeda, "Method of Manufacturing Chip-Type Electrolytic Capacitor", English translation of JP 2002-175939 A, JPO, Jun. 2002.*

*Primary Examiner*—Stephen W Smoot
(74) *Attorney, Agent, or Firm*—McKee, Voorhees & Sease, P.L.C.

(57) ABSTRACT

A surface mount capacitor (10) and method for making the same. A solid slug or pellet anode body (1) is encapsulated in a case (6) of insulating material. An anode and cathode termination pair (2, 3) are formed with surface mount mounting portions on one side of the case (6). An electrical connection (4) is made from the cathode termination (2) to a cathode on pellet (1) through the case (6). An electrical connection (7) is made between an anode associated with the pellet (1) and the anode termination (3) externally of the case (6). The external connection (7) allows improved volumetric efficiency by freeing up space in the case (6) for a bigger pellet (1). The method includes mass producing these capacitors (10) by mounting a plurality of pellets (1) on a lead frame (11) with pre-formed anode/cathode termination pairs (2, 3), at least substantially encapsulating the plurality of mounted pellets (1) and each pellet's associated anode and cathode, singulating the encapsulated pellets (1) to expose a portion of the pellet anode, and applying the electrical external conductive path (7) between pellet anode and anode termination (3).

15 Claims, 16 Drawing Sheets

U.S. PATENT DOCUMENTS

| | | |
|---|---|---|
| 6,380,577 B1 | 4/2002 | Cadwallader |
| 6,920,037 B2 * | 7/2005 | Sano et al. ................. 361/540 |
| 6,992,880 B2 * | 1/2006 | Tadanobu et al. ........... 361/523 |
| 2002/0054470 A1 | 5/2002 | Kuriyama |
| 2004/0103508 A1 * | 6/2004 | Kanetake .................... 29/25.03 |
| 2004/0154149 A1 * | 8/2004 | Melody et al. ............. 29/25.03 |
| 2004/0235446 A1 | 11/2004 | Flaherty et al. |
| 2007/0081301 A1 * | 4/2007 | Tanaka ....................... 361/540 |

* cited by examiner

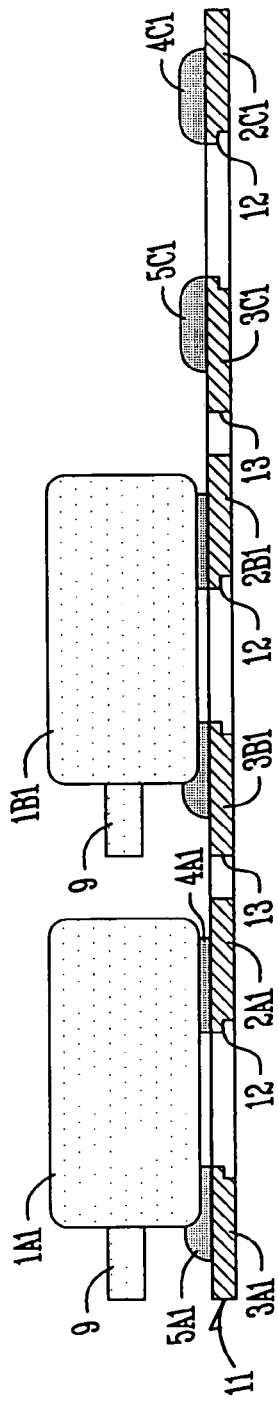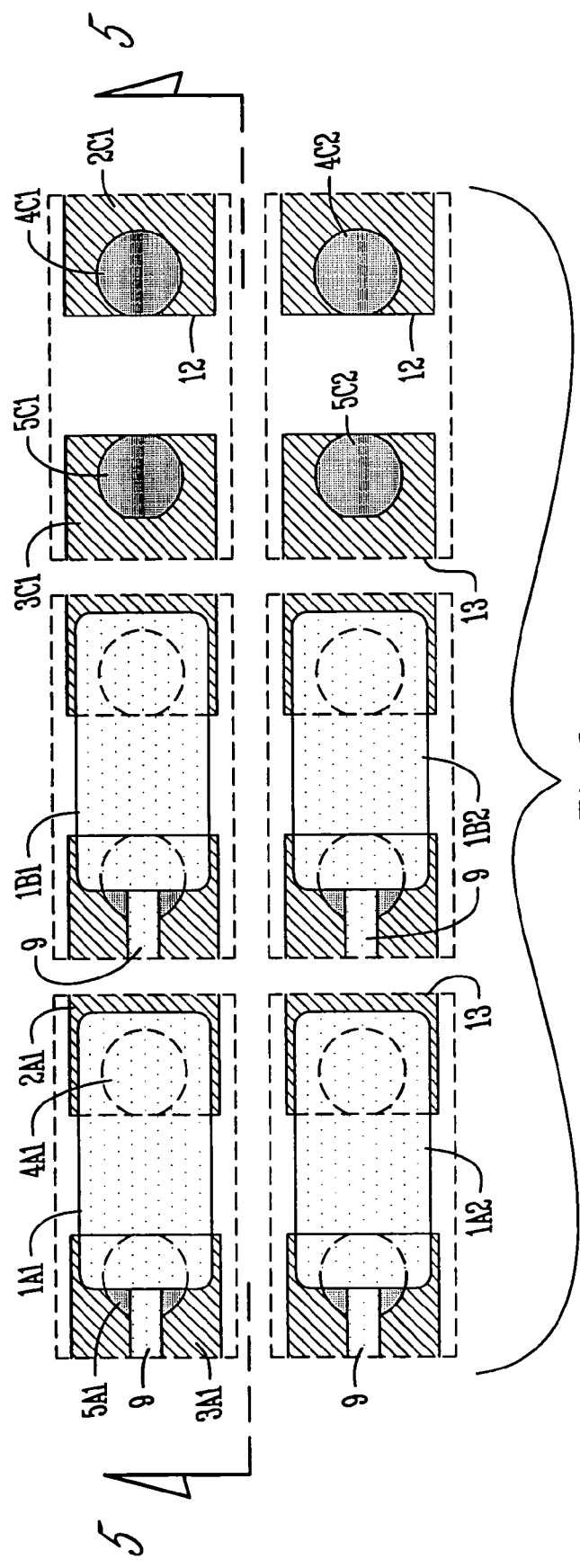

METHOD OF MANUFACTURING SURFACE MOUNT CAPACITOR

INCORPORATION BY REFERENCE

This application is a Divisional of U. S. application Ser. No. 11/132,116 filed May 17, 2005, now issued as U.S. Pat. No. 7,161,797, herein incorporated by reference in its entirety. The contents of U.S. Pat. No. 6,380,577, issued Apr. 30, 2002, and U.S. Pat. No. 6,238,444, issued May 29, 2001, are also incorporated by reference in their entireties.

I. BACKGROUND OF THE INVENTION

A. Field of the Invention

The present invention relates to surface mount capacitors and, in particular, to surface mount capacitors having a capacitive element substantially encapsulated in a body or case.

B. Problems in the Art

Demand has steadily increased for surface mount capacitors. They are useful for numerous and widely-varying applications and functions. For example, they are useful for maintaining signal integrity and high speed delivery of charge in electrical and electronic components or devices. They are also particularly useful in switching functions. They are useful for bulk decoupling capabilities to smooth transient requirements seen by a power source.

The types and configurations presently available are numerous. Most have some type of capacitive element inside an enclosure or case. External conductive connections or terminations are electrically connected to the internal capacitive element. The capacitor assembly can be placed upon a circuit board and connected to the circuit through the terminations.

Different capacitive element configurations produce different capacitive performance. The nature of the capacitive elements can determine their size. For example, some need to handle high voltage and, to do so, must use relatively large capacitive elements. This results in a relatively large case size.

However, many times the size of electrical components is important in circuit design. This brings what is called "volumetric efficiency" into play. Volumetric efficiency is known in the art to refer to capacitance per unit volume. Two aspects of volumetric efficiency relative to the present invention are as follows.

First, there is volumetric efficiency of the capacitive element itself. Some materials have a higher capacitance performance than others for the same size or volume. A good example is tantalum. It is well-known that a solid tantalum capacitive element exhibits more capacitive performance than aluminum for the same volume.

Second, there is volumetric efficiency of the entire capacitor; namely the capacitive element(s), case, and terminations. The case defines a certain volume. If the volume of the capacitive element inside the case is small relative to the total volume of the case, the volumetric efficiency of the entire capacitor is normally lower than if the volume of the capacitive element is large relative to case size.

If room on the circuit board for the capacitor is not a concern, volumetric efficiency may not be a concern. However, as can be appreciated, volumetric efficiency becomes increasingly important as space for the capacitor becomes more limited. As increasing miniaturization occurs for a wide variety of electronic and electrical devices, demand increases for increasingly smaller surface mount capacitors.

Capacitors can represent the highest part count in many circuits. Therefore, a reduction in case size (and thus volume) of capacitors, while maintaining (or even increasing) capacitive performance, is an important present need in the art. Circuit designers need to be able to specify a certain case size for capacitors to allow them to fit on a circuit board with the other components needed for the electrical or electronic device.

However, it is difficult to simultaneously meet increasing capacitive performance needs and at the same time have a very small package or case size. Minimizing size while maintaining or improving capacitor performance is a challenging task. Additionally, independent of case size, there is always a need to improve the performance of, and volumetric efficiency of, capacitive elements and capacitor assemblies.

One way to improve volumetric efficiency is to use a high performing material, for example tantalum (Ta), Niobium (Nb), or Niobium Oxide (NbO), for the anode material. Solid core or pellet surface mount capacitors of this general type are well known in the art. Examples can be seen at U.S. Pat. Nos. 6,380,577 and 6,238,444, incorporated by reference herein. In those patents, the solid interior core (sometimes called an anode body, slug or pellet) is primarily Ta. The tantalum anode body is usually sintered. A wire is commonly formed in the anode body in one of two ways; (a)"embedded", meaning the wire (also can be Tantalum) is covered with Tantalum powder during a pressing process or (b) "welded" meaning after the pellet is pressed and sintered, the wire is welded to the Ta slug. The other end extends outside the slug. The capacitor dielectric material is made by anodic oxidation of the anode material to form an oxide layer over the surface of the anode body (e.g. Ta→$Ta_2O_5$). If the anode body is Nb the oxidation is Nb→$Nb_2O_5$; if NbO, the oxidation is NbO→$Nb_2O_5$. A capacitor cathode is commonly formed by coating the dielectric layer with a solid electrolyte layer (e.g. of $MnO_2$) and a conductive polymer, and later covered with graphite and silver for better conductivity and improved mechanical strength. Anode and cathode terminations can be connected to the free end of the Ta wire and the outer electrolyte surface coating of the Ta pellet, respectively, and all these components can then be encapsulated within a case (e.g. by molding plastic around the components), leaving only outer surface(s) of the anode and cathode terminations exposed on the exterior of the case for, e.g., surface mounting.

U.S. Pat. Nos. 6,380,577 and 6,238,444, describe surface mount tantalum capacitors of this general type. However, the terminations extend around the edges of the case ends in a U-shape. Therefore, they are known as "wrap around" terminations. As can be seen at FIG. 6 of U.S. Pat. Nos. 6,380,577 and 6,238,444, these "wrap around" portions (reference number 36) provide an anode/cathode termination pair in two planes or sides of the device. While this allows the device to be surface-mounted on one of two sides (they can be referred to as "two-sided terminations"), as compared to "single-sided" terminations, which can be surface mounted on one side only, it presents a problem. These "wrap around" or "two-sided" terminations can result in shorting between opposite ends of the device when in place on a circuit board. An example of this shorting problem exists in many radio frequency (RF) applications where metal shielding is placed over at least portions of the circuit boards. Portions of the conductive terminations extend up to and into the top plane of the capacitor case.

Therefore, there is a demand for capacitors with "single-sided terminations", meaning an anode and cathode termination pair for surface mounting exist on only one side or plane of the device. One configuration for such capacitors is illustrated in the drawing of FIG. 13A, a solid slug (e.g. Ta) capacitor. This cross-sectional view shows a conventional tantalum slug or pellet 1 with an outward extending embedded tantalum wire 9 encapsulated in case 6 of plastic material. Anode termination 3 is positioned on what will be called the bottom surface of encapsulating material or case 6 directly underneath the free end of wire 9. A conductive adhesive 4 and an internal conductive path 15 electrically communicate the free end of wire 9 with anode termination 3 through the encapsulating material 6. A cathode termination 2 (also on the bottom side of the encapsulating material or case 6 but directly underneath the end of pellet 1 opposite wire 9) is electrically connected to the exterior of pellet 1 through another pad of conductive adhesive 4. Thus, in comparison to the wrap around terminations of the capacitors of U.S. Pat. Nos. 6,380,577 and 6,238,444, the capacitor of FIG. 13A has single-sided terminations. The anode and cathode terminations are in the same general plane on one side, the bottom side as shown in FIG. 13A, of the capacitor device. A similar prior art embodiment of such a single-sided termination capacitor is illustrated in FIG. 13B.

While the prior art capacitors of FIGS. 13A and B do not present the earlier discussed problem associated with the "wrap around" terminations of U.S. Pat. Nos. 6,380,577 and 6,238,444, they do present a volumetric efficiency issue. As shown in the cross section views of in FIGS. 13A and B, the encapsulating material of case 6 encases not only pellet 1 but all of the outward extending portion of wire 9. In particular, there is a substantial volume of case 6 between the distal end of wire 9 and the outer surface of case 6. Sufficient space must be allowed for the interior electrical connection or path 15 between wire 9 and anode termination 3. In essence, a rather substantial volume of encapsulating material in case 6 is used up to completely encase both the free end of wire 9 and the connection 15 between wire 9 and anode termination 3. This limits the size of Ta pellet that can be placed in case 6. A substantial volume of the entire capacitor case must be dedicated to the electrical connection of wire 9 to anode termination 3, as opposed to being filled more completely with pellet 1.

Therefore, a need in the art exists for a surface mount capacitor with improved volumetric efficiency.

Furthermore, it is difficult to optimize volumetric efficiency (capacitance per unit volume of the device) when manufacturing such capacitors, especially when the devices are of the smaller case sizes. It is difficult to control the thickness and uniformity of thickness of the encapsulating material around the capacitive element (e.g. pellet 1), both when molding the material around the pellet and when producing the final device. This is either ignored or tends to result in over-compensation in designs and manufacturing steps that result in thicker case walls which, in turn, limits space for the capacitive element. Many present state-of-the-art capacitors therefore have relatively thick case walls. Volumetric efficiency suffers.

As can be appreciated, these volumetric efficiency issues apply to other single-side termination surface mount capacitors as well. Any increase in volumetric efficiency can potentially be beneficial regardless of size or type of capacitor. A real need in the art has therefore been identified for an improved single-sided termination surface mount capacitor.

II. SUMMARY OF THE INVENTION

It is therefore a principal object, feature, aspect, or advantage of the present invention to provide an apparatus and method which improves upon the state of the art.

Other objects, features, aspects, or advantages of the invention include an apparatus or method which:

a. improves volume utilization or volumetric efficiency;

b. improves flexibility for molded case surface mount capacitors, including the ability to produce a variety of sizes with the same assembly line and molding equipment;

c. is efficient and economical, including for small case size mass production;

d. can be implemented in large scale manufacturing techniques;

e. reduces risk of shorting between terminations as compared to wrap around terminations.

These and other objects, features, aspects, and advantages of the present invention will become more apparent with reference to the accompanying specification and claims.

III. BRIEF DESCRIPTION OF THE DRAWINGS

FIG. 5 is a diagrammatic side elevation, partial sectional depiction of a plurality of tantalum pellet/wire (could be embedded or welded) combinations mounted on a metal substrate or under layer, also called a lead frame, to illustrate one step of an exemplary manufacturing method for capacitors of the type of FIG. 1 according to one aspect of the present invention.

FIG. 6 is a top plan view of FIG. 5.

Figure 13A:
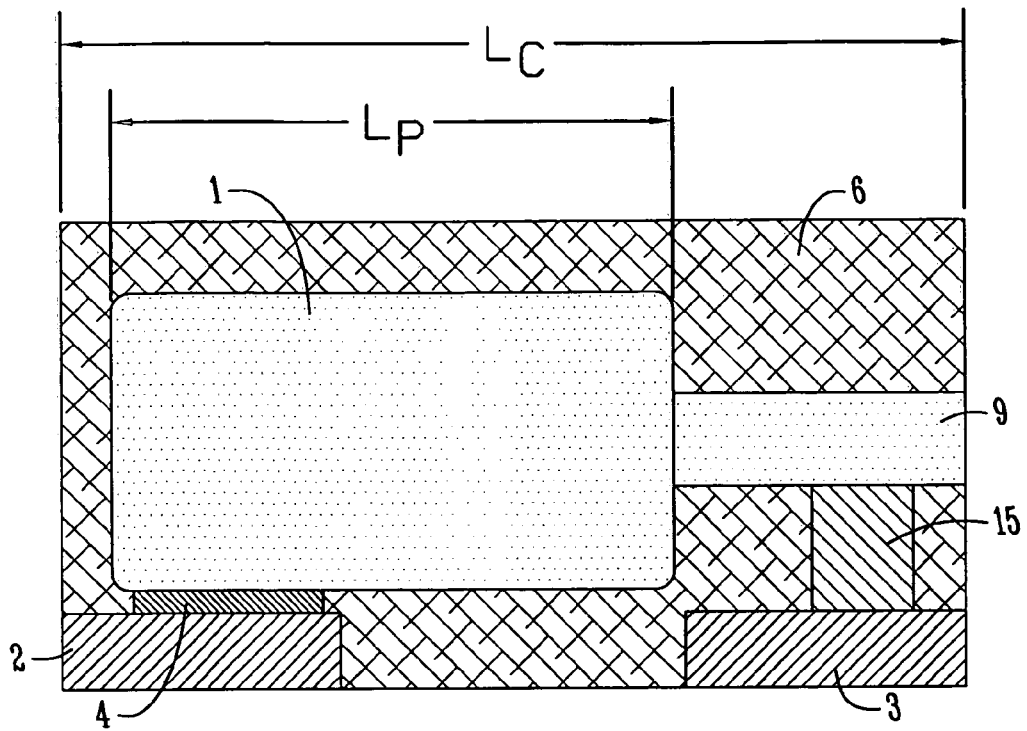
FIG. 13A is a cross-sectional view similar to FIG. 3 but illustrating a prior art capacitor of the general tantalum pellet surface mount type, showing a internal electrical connection between the interior tantalum pellet and the external bottom anode termination for a particular case or package size capacitor.
Figure 14:
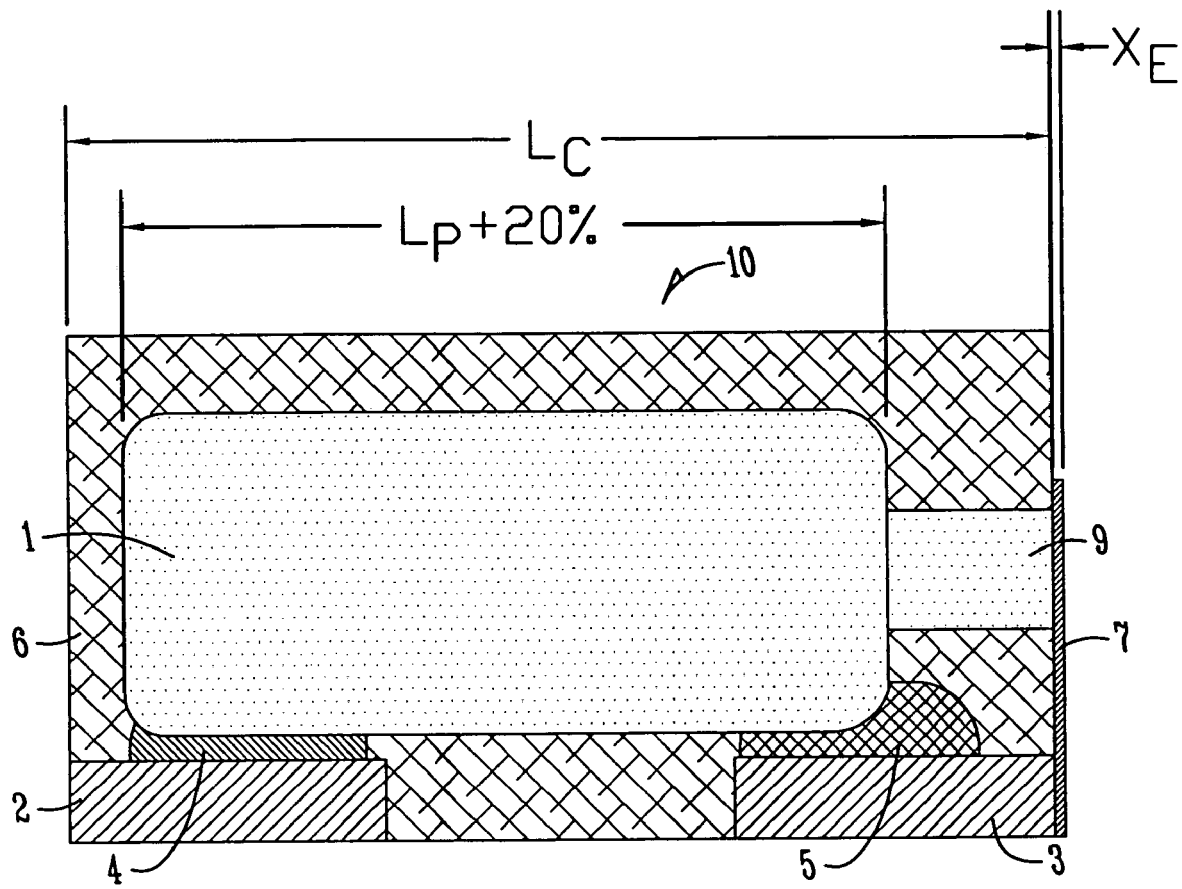

FIG. 14, for comparison, is a similar cross-section to that of FIG. 13A for the same case or package size for an exemplary embodiment of the present invention and shows how it improves volumetric efficiency for such a capacitor.

Figure 15:
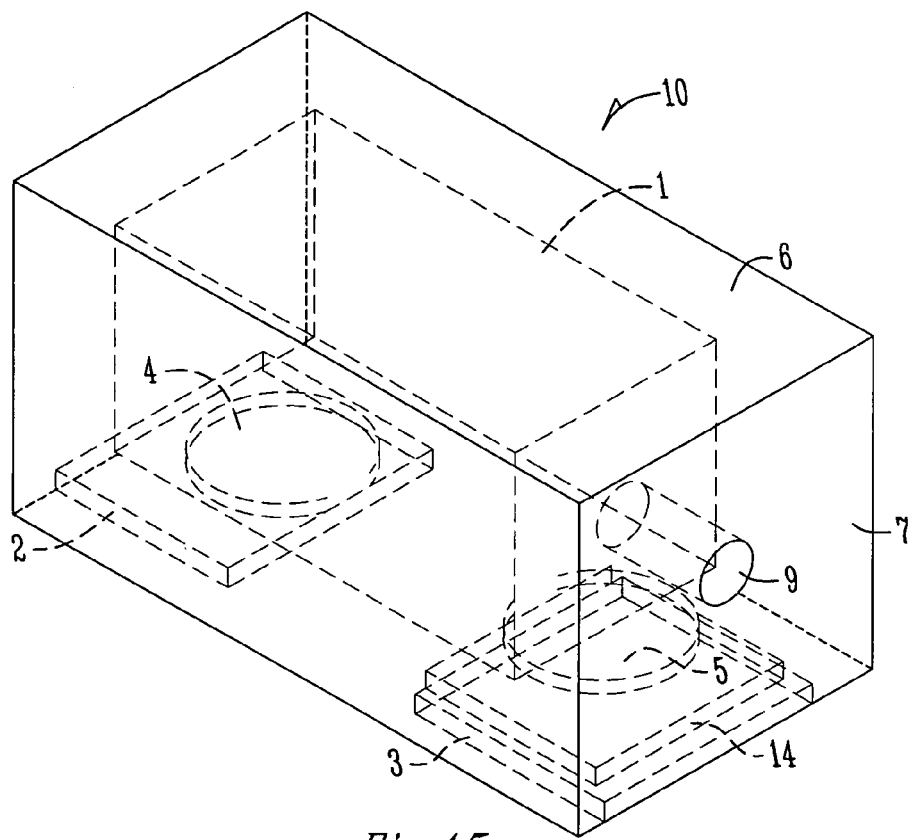

FIG. 15 is a perspective view of a finished capacitor according to one exemplary embodiment of the present invention but shows the case in ghost lines and the other components in solid lines.

Figure 16:
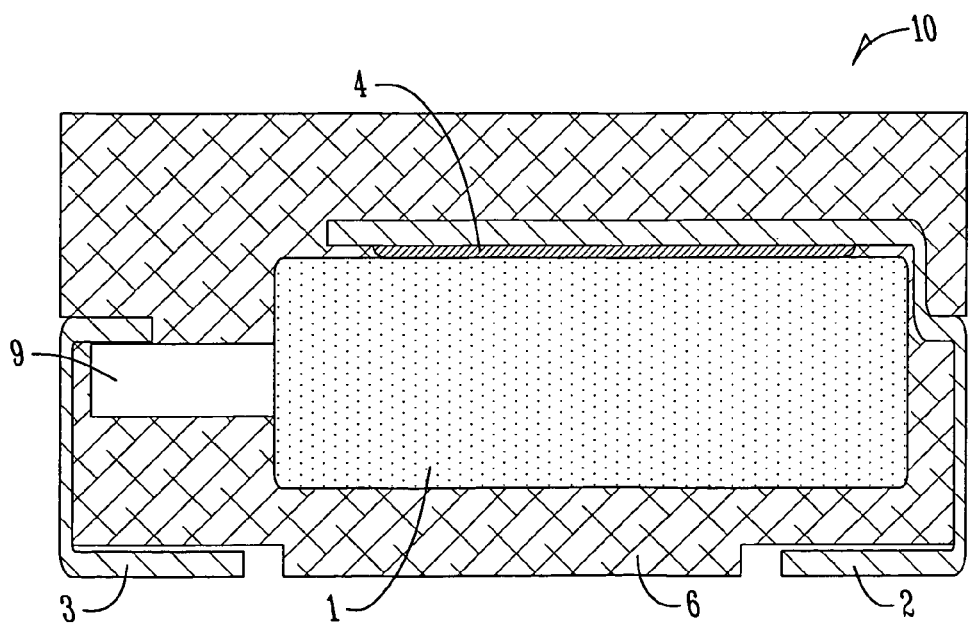

FIG. 16 is a sectional view of another prior art device.

Figure 17:
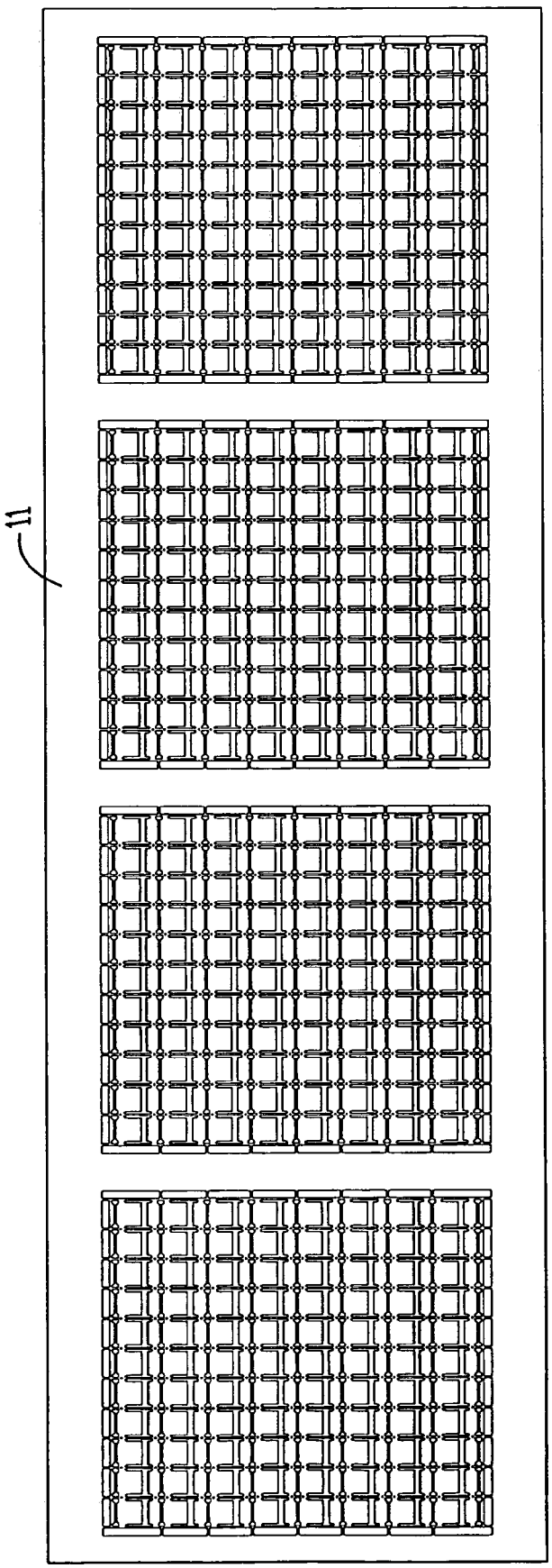

FIG. 17 is a reduced-in-scale top plan view of a lead frame assembly with a plurality of capacitors mounted thereon.

IV. DETAILED DESCRIPTION OF AN EXEMPLARY EMBODIMENT ACCORDING TO THE INVENTION

A. Overview

For a better understanding of the present invention, an exemplary embodiment will now be described in detail. Frequent reference will be taken to the above-described drawings. Reference numerals and/or letters will be used to indicate certain parts or locations in the drawings. The same reference numerals and/or letters will be used to indicate the same parts or locations throughout the drawings unless otherwise indicated.

The context of this exemplary embodiment is a surface mount capacitor of the general type disclosed in U.S. Pat. Nos. 6,380,577 and 6,238,444 except rather than "wrap around" terminations, it has single-sided terminations—anode and cathode terminations are both in generally the same plane on only one side (here the bottom surface mount side) of the device. In particular, this exemplary embodiment is a surface mount molded solid electrolyte tantalum capacitor having anode and cathode terminations on the bottom plane of the casing. The casing size of this example, case size 0603 (such as is known in the art), is relatively small (approximate dimensions: length of 1.6 (+/−0.1) mm; width of 0.8 (+/−0.1) mm; and height of 0.8 (+/−0.1) mm). This represents a case volume of roughly a little over 1 mm³. Examples of other relatively small case sizes are 0402 and 0805. However, the invention is not limited to any particular case size or any particular material or configuration of capacitive element inside the case. In fact, the invention can be scaled up or down as desired. One of the advantages or features of the invention is that ability—namely, the ability to apply this to a variety of different capacitor package sizes while using the same concepts and manufacturing techniques.

B. Exemplary Apparatus

By reference to FIGS. 1-3, 14, and 15, an exemplary capacitor 10, according to one aspect of the present invention, is illustrated. Capacitor 10 includes an outer case or encapsulating material 6 of conventional plastic material. The case size of case 6 is 0603. An external anode polarity marking 8, conventional in the art, provides a visual indication on the top surface of capacitor 10 of its anode termination end (see FIG. 1).

Figure 1:
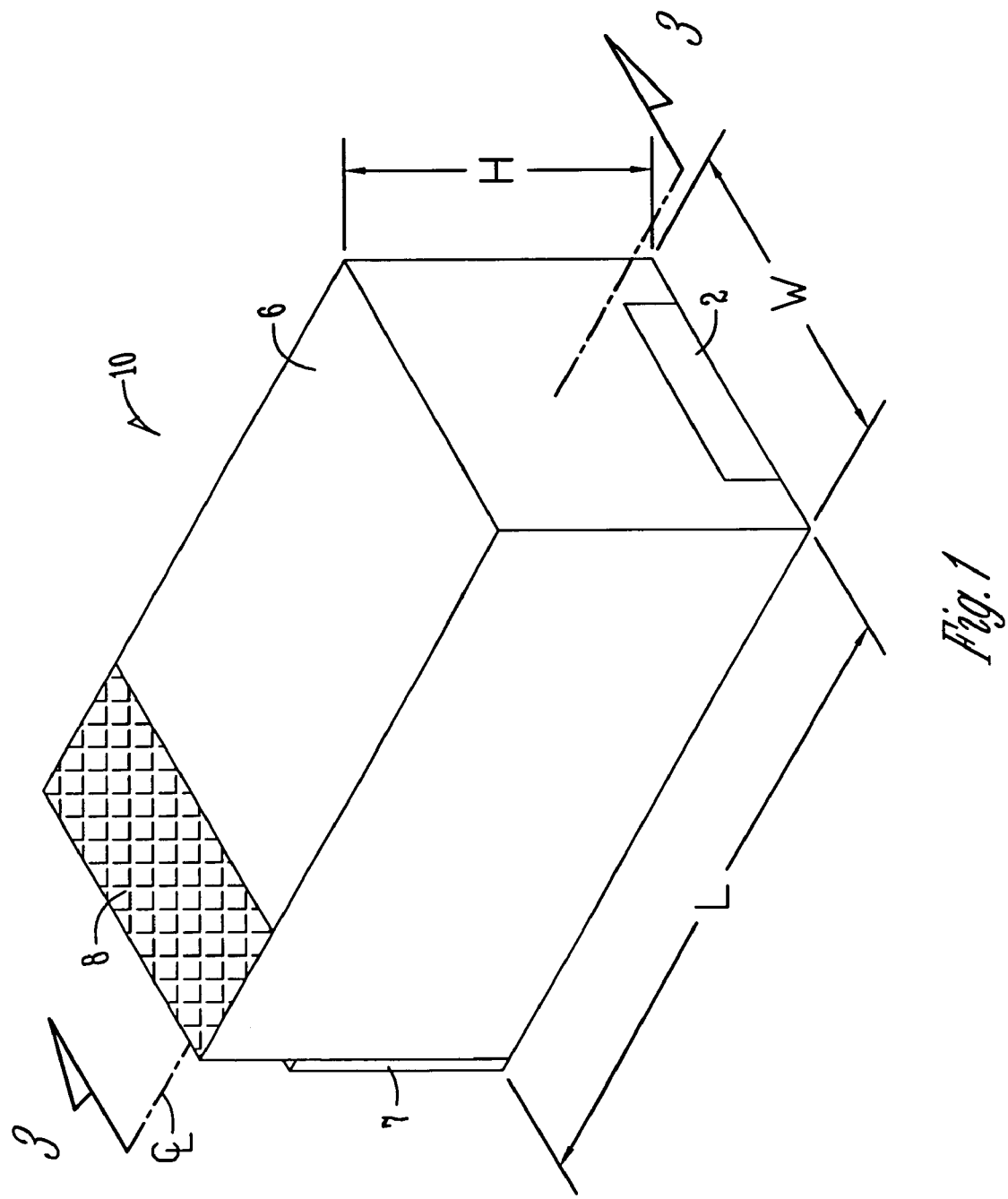
FIG. 1 is a perspective diagram of a capacitor according to one aspect of the present invention.
Figure 1A:
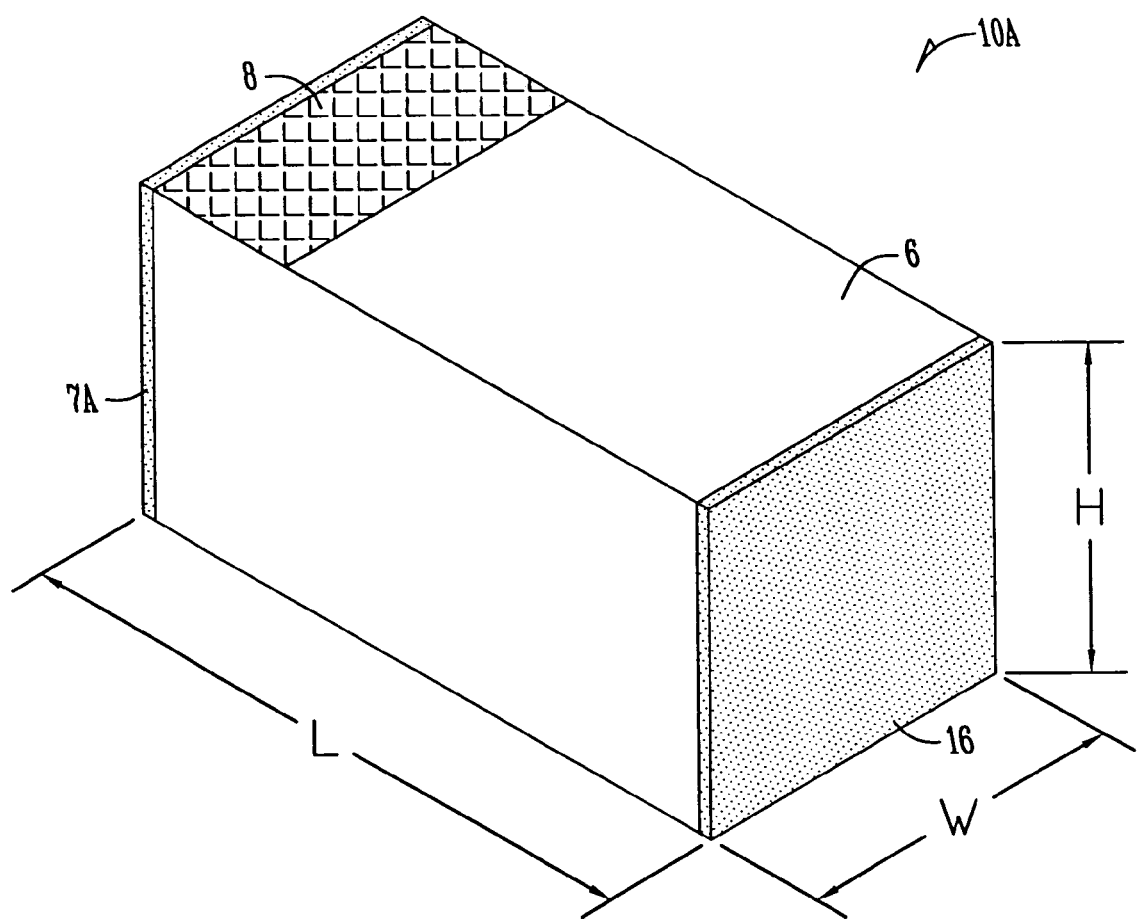
FIG. 1A is similar to FIG. 1 but has different terminations.

Capacitor 10 is elongated along a longitudinal axis (see broken section line of FIG. 1). Its bottom surface (see FIGS. 2, 3, 14, and 15) includes anode termination 3 and a cathode termination 2. They are conventional and made of conventional material (e.g. copper (Cu) or silver (Ag) or nickel alloys). Terminations 2 and 3 are at opposite ends of, and their facing edges are separated an acceptable distance from each other, on the bottom of case 6.

Figure 3:
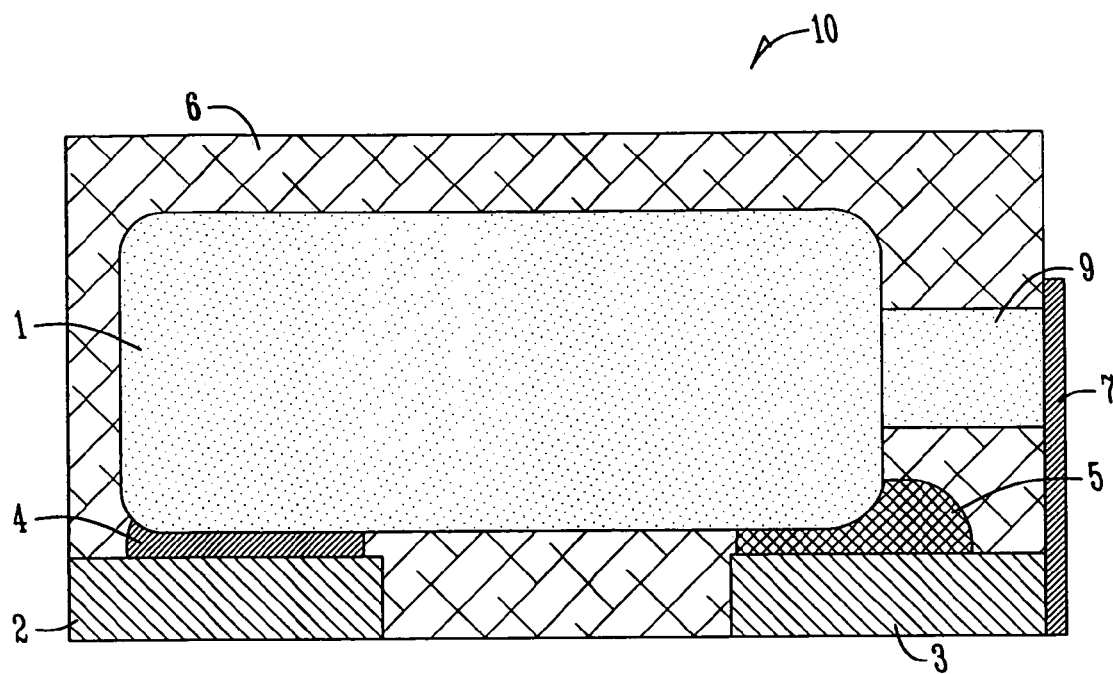
FIG. 3 is a sectional view taken along line 3-3 of FIG. 1, slightly enlarged from that of FIG. 1.
Figure 3A:
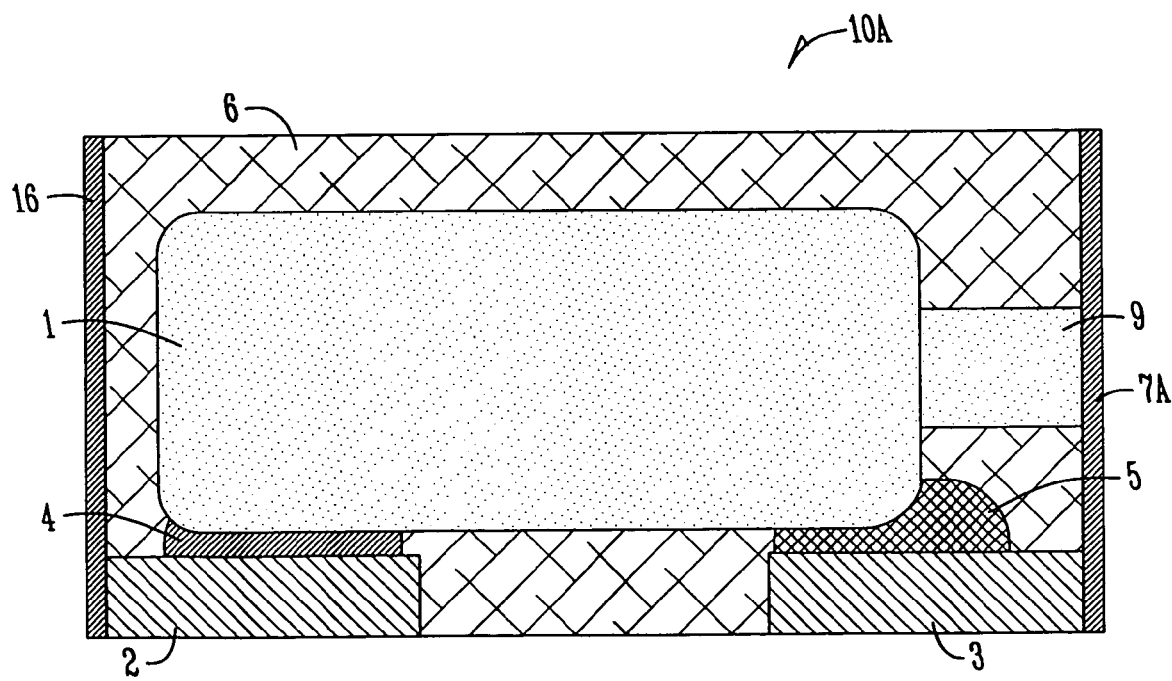
FIG. 3A is similar to FIG. 3 but with the alternative terminations of FIG. 1A.
Figure 4:
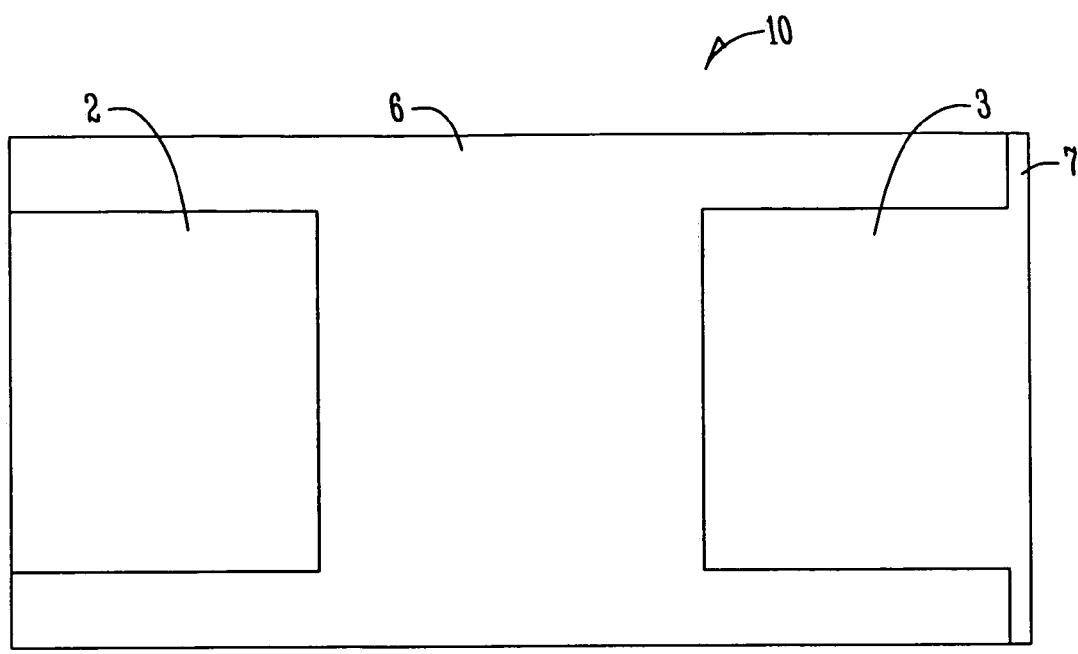
FIG. 4 is a slightly enlarged bottom plan view of FIG. 1.
Figure 4A:
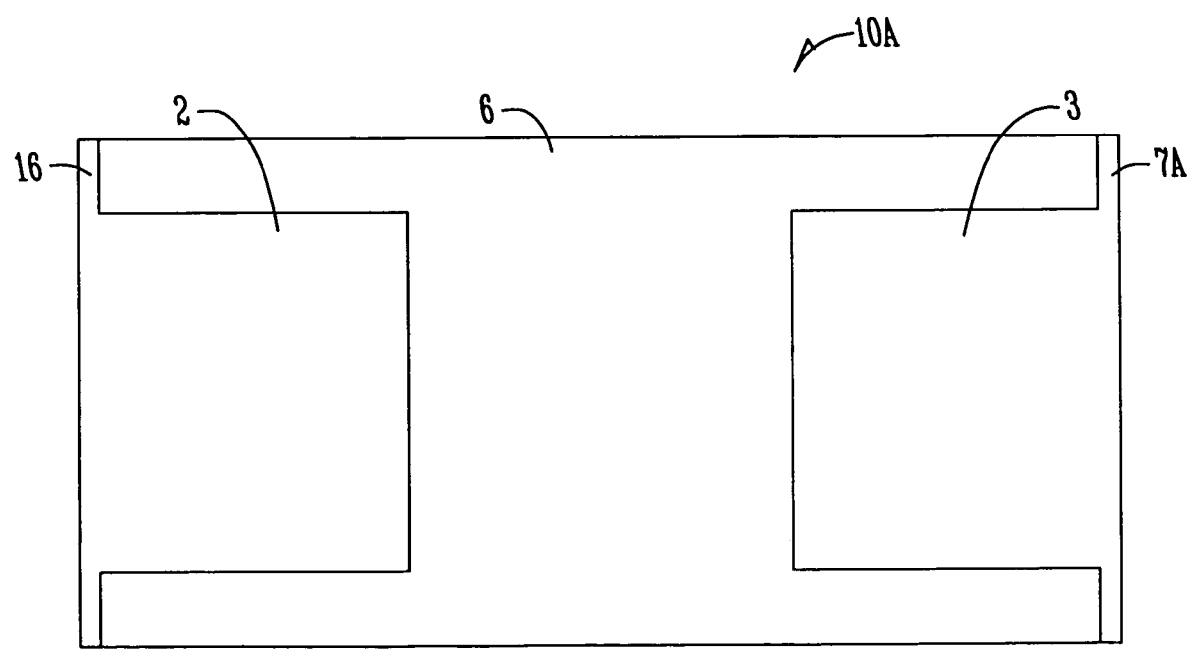
FIG. 4A is similar to FIG. 4, but with the alternative terminations of FIG. 1A.

By referring to FIG. 3, inside case 6 of capacitor 10 is a tantalum anode body, pellet or slug 1. It could be made of other analogous materials (e.g. Nb or NbO). It is pre-manufactured according to known methods, as previously described. It is also elongated along the longitudinal axis of capacitor 10 but has a layer of encapsulating material 6 around most of it to isolate and insulate it from the exterior. As is conventional, a tantalum wire 9 is connected to pellet 1 and extends out one end of pellet 1 inside case 6.

The foregoing components are generally conventional in the art. To better understand differences of capacitor 10 from state of the art single-sided termination surface mount tantalum slug capacitors, reference will now be taken to FIGS. 13A, 13B and 14.

Figure 13B:
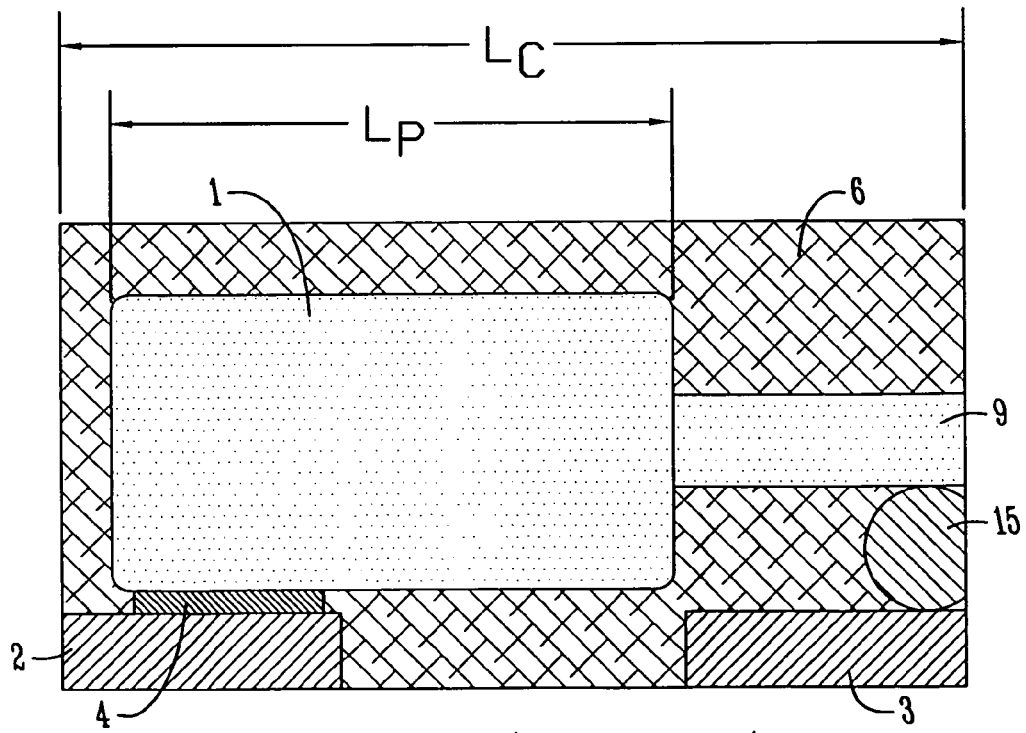
FIG. 13B is similar to FIG. 13A but with the alternative terminations of FIG. 1A.

FIG. 13A shows the conventional state of the art or prior art structure for these types of capacitors. FIG. 13B shows a similar prior art variation. Such capacitors encapsulate all of wire 9 in the case, leaving a substantial amount of volume of the case surrounding all sides of wire 9 and slug 1. Internally (or substantially internally), there is an electrical conductive path 15 between the encapsulated end of wire 9 and the external anode termination 3, and an electrical path 4 between the slug surface at the opposite end of pellet 1 and cathode termination 2. Therefore, the only electrically conductive external components on the prior art capacitor of FIG. 13A would be the outer surfaces of anode and cathode terminations 3 and 2 on the bottom of the capacitor and the exposed end of wire 9 in the plane of the end of the capacitor. All else is encapsulated in case 6. FIG. 13B is likewise except a part of conductive path 15 is also exposed along the wire 9 side of the case.

In comparison, with particular reference to FIG. 14, as well as FIGS. 1-4 and 15, capacitor 10, an exemplary embodiment of the present invention, differs from that of the prior art capacitors of FIGS. 13A and 13B primarily in the following ways.

First, the length Lp+20%, of Ta pellet 1 of capacitor 10 of FIG. 14 is substantially longer than, and therefore substantially larger in volume than, the length Lp and volume of the Ta pellet of the capacitor of FIGS. 13A and B (see indication in FIG. 14 that in this particular comparison, length of the Ta pellet of capacitor 10 is approximately 20% longer).

Second, wire 9 extends to the external boundary of one end of case 6. It is intentionally exposed (see FIG. 10). An external conductive path 7 (e.g. a metal deposition layer) is added (e.g. by conventional metal deposition techniques). All individual units undergo deposition of a conductive layer that covers one or both capacitor ends in a process such as sputtering, stencil printing, or screen printing. The materials used for such a process could be metals such as: Ag, Ni, Cr, Ta, Cu, Au, Pd; or alloys such as: AuPd, NiCr, NiPd or polymer based pastes containing such metals. This conductive layer allows reliable electrical contact between the anode wire and the metal array which is used as anode termination of the capacitor. Refer to FIGS. 1-4, 10-12, and 15 to see how external conductive path 7 connects wire 9 and anode termination 3.

Third, in the prior art capacitors of FIGS. 13A and B, pellet 1 is usually directly electrically connected through the material of case 6 to cathode termination 2, and wire 9 is similarly connected to anode termination 3. Some type of electrically conductive material or member 4 and/or 15 is usually between anode termination 3 and wire 9 and between cathode termination 2 and the opposite end of pellet 1 respectively. One example is an electrically conductive (e.g. silver based)

adhesive (see reference number 4 in FIGS. 13A and B) that both binds pellet 1/wire 9 to the terminations 2 and 3 during fabrication and provides an electrically conductive path for operation of the device as a capacitor. Such conductive adhesive is well-known in the art and available from a variety of commercial sources. In comparison, in capacitor 10 the only electrical path from wire 9 to anode termination 3 is through the external conductive path or member 7. Instead of an electrically conductive adhesive or path between anode termination 3 and wire 9, an insulator is used (here insulative adhesive 5) to support one end of pellet 1 during molding, as will be described later. Such insulative adhesive is well-known in the art and available from a variety of commercial sources. Capacitor 10 eliminates the need of room inside case 6 for the internal conductive path 15 of FIGS. 13A and B. Electrically conductive adhesive 4 is still used between pellet 1 and cathode termination 2 (e.g. Cu) in capacitor 10. Furthermore, as indicated at FIG. 15, an addition insulative layer 14 can be placed between anode termination 3 and pellet 1. Layer 14 can be made of dispensable and printable surface mount paint/ink, such as "Perma CI Series Ink" available from Automated Industrial Systems, Inc. (Erie, Pa., USA), and can have properties to adhere it to anode termination 3, or alternatively be adhered by appropriate adhesive.

Thus, FIGS. 13A and 14 illustrate one way capacitor 10 can increase volumetric efficiency relative to the state of art capacitors. For reference purposes FIG. 13A has the following dimensions indicated: $L_c$=length of case; $L_p$=length of pellet; $L_e$=length of external conductive path, relative to the longitudinal axis of capacitor. Assume each capacitor of FIGS. 13A and 14 has the same case size (0603) and therefore the same overall case height $H_c$, case width $W_c$, and length case $L_c$. Those dimensions would be equal for both FIGS. 13A and 14. However, connection of anode termination 3 on the outside of case 6, with external electrical conductive path 7 between the exposed end of wire 9 and the anode termination 3, allows pellet 1 of capacitor 10 of FIG. 14 to occupy more space inside case 6. Because the case size is fixed, this allows the volume of pellet 1 of FIG. 14 to be increased relative to the total volume of case 6. In other words, the length of pellet 1 of capacitor 10 of FIG. 14 is substantially greater (20%) than $L_p$ of the tantalum pellet in the capacitor of FIG. 13A. Normally, capacitance of tantalum increases with volume. Therefore, by increasing the volume of tantalum pellet 1 in comparison to the total volume of case 6, increased utilization of the case or package 6 is achieved (more capacitance per unit volume) and, thus, improved volumetric efficiency is achieved over that of FIG. 13A.

As indicated in FIG. 14, on the order of 20% increase in length of pellet 1 is possible in this 0603 case by using external conductive path 7 (e.g. pellet length can be increased around 1.00 mm to 1.25 mm). This would therefore increase the volume of pellet 1 (although by something less than 20% because height and width remain the same). While the increase in volumetric efficiency can vary depending on several factors, this could represent a substantial increase. Tests have indicated from up to on the order of 70% increase in volumetric efficiency is possible depending, in part, on case size. Testing indicates even greater increases might be possible (for example 100% or double or more).

C. Method of Manufacturing

By reference to FIGS. 5-12, an exemplary method of making capacitors 10 is illustrated. The method can be used to mass produce capacitors 10.

1. Starting Materials

A plurality of pellets 1 are first produced by conventional methods. Each pellet is connected to a portion of wire 9. The portion outside pellet 1 is cut to the approximate length shown in the Figures.

Figure 8:
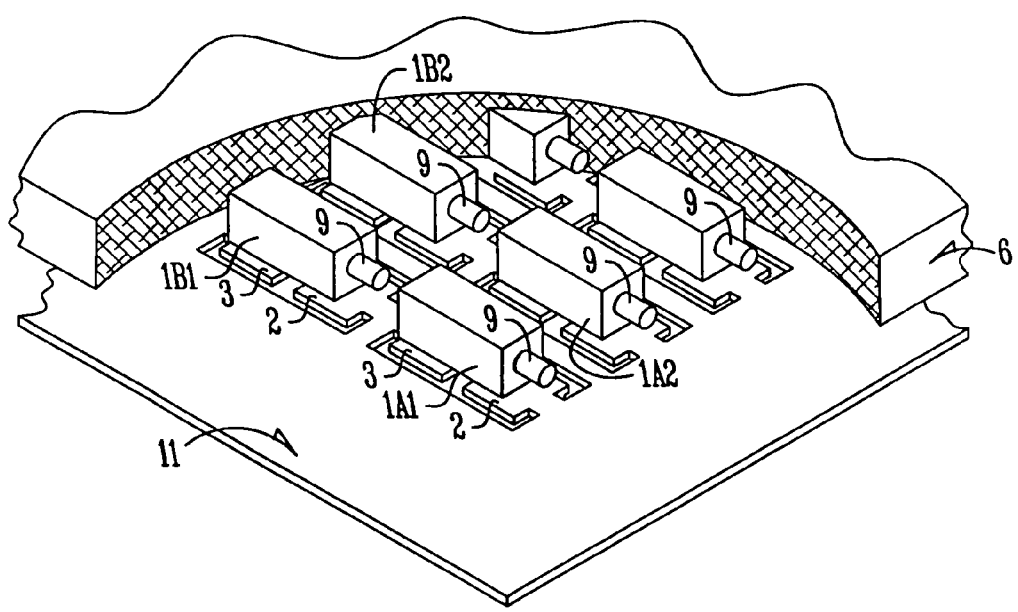
FIG. 8 is a slightly enlarged perspective view of a portion of FIG. 7.

An electrically conductive (metal plate) substrate or lead frame 11 is pre-manufactured to include rows and columns of pre-formed adjacent anode termination 3 and cathode 2 termination pairs with open space substantially around them (see FIG. 8).

2. Anode Terminal Insulation

A small electrically insulating pad 14 (shown only in FIG. 15) can be placed on or adhered to the top of each anode termination 3 on lead frame 11. It covers most of the inner surface of anode termination 3. Unlike the anode termination of state of the art capacitors (see FIG. 13A), which supports the pellet during molding of the case but also supports and electrically connects the anode termination with the pellet by the internal conductive path 15, here the anode termination merely supports the pellet during molding but does not utilize that support structure or material (e.g. insulating adhesive) for an electrical connection. Note how the longer pellet 1 in capacitor 10 extends more directly over anode termination 3. A substantial part of it is therefore in relatively close proximity to anode termination 3. Therefore, insulating pad 14 helps provide good electrical insulation between pellet 1 and anode termination 3.

3. Pellet to Lead Frame Assembly

Pads or dabs of electrically conductive adhesive 4 are then placed on each cathode termination 2 of lead frame 11, and pads or dabs of electrically insulating adhesive 5 are placed on top of each insulating layer 14 on each anode termination 3 (see FIGS. 5 and 6). Individual tantalum pellet/wire combinations 1/9 are then placed or pressed down onto pads 4 and 5 to adhesively connect them to and support them on lead frame 11; one pellet/wire combination 1/9 to each anode/cathode termination pair 3/2 by placing each pellet 1 in the orientation shown in FIGS. 5 and 6 (wires 9 pointing in the same direction). The end of pellet 1 with wire 9 is on the dab or spot of insulative adhesive 5 on anode termination 3 (covers less area than insulative pad 14) and the other end of pellet 1 on conductive adhesive 4 on cathode termination 2. Note how the distal end of each wire 9 extends to generally the same vertical plane as the distal edge of its corresponding anode termination 3.

Figure 7:
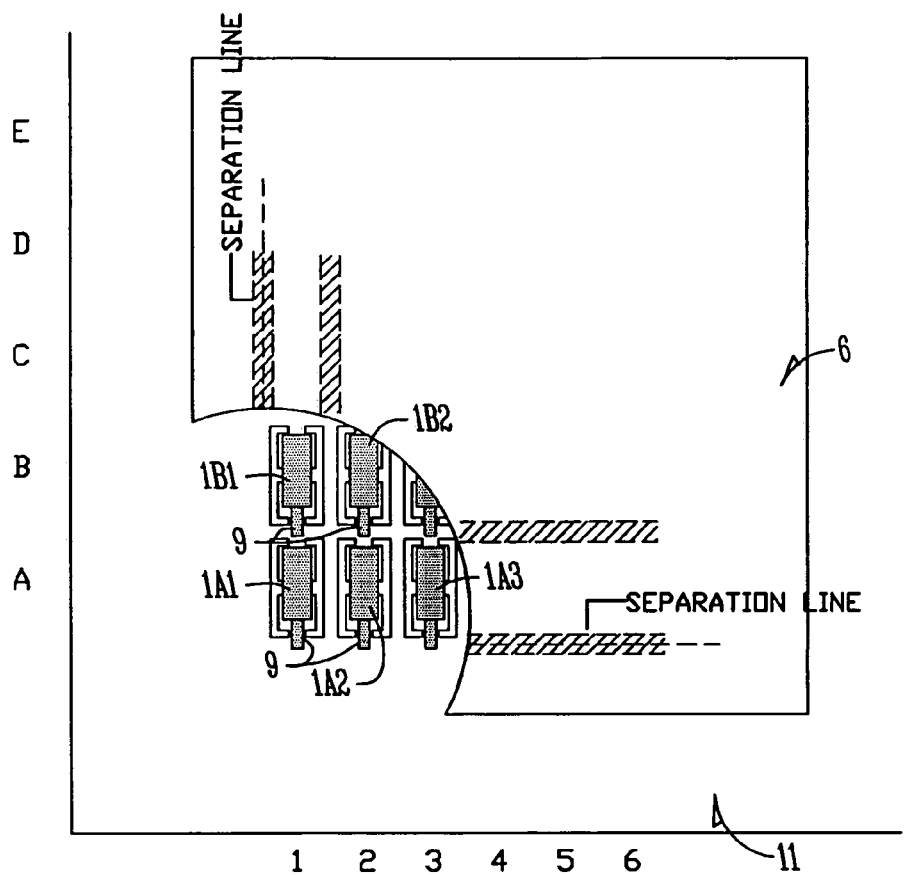
FIG. 7 is a reduced-in-size top plan view of a subsequent molding step, showing a plurality of combinations like shown in FIGS. 5 and 6 but with an encapsulating material applied to them (part of the encapsulating material is shown cut away for illustration purposes).

Further steps of this method will be described by referring to individual pellets or capacitors by position on lead frame 11. By referring to FIGS. 7-9, it can be seen that lead frame 11 can have plural rows and columns of pre-formed anode/cathode termination pairs. For purposes of this discussion, columns on the lead frame are referred to by the letters A, B, C, D, E, etc., as indicated in FIG. 7. Rows are indicated by numbers 1, 2, 3, 4, 5, 6, 7, 8, etc. (see numbers along other side of the lead frame array in FIG. 7). Individual pellets 1 will be referred to by the reference numeral "1" followed by column and row position. For example, the pellet 1 in the first column and first row of lead frame 11 will be referred to by the reference numeral 1A1, the pellet in column B, row 1 by the reference numeral 1B1, and so on.

FIGS. 5 and 6 illustrate the step of adding pellets to lead frame 11, showing pellets 1A1, 1A2, 1B1, and 1B2 in place on their respective adhesive pads 4 and 5. Pellets have not yet been placed onto the pre-applied adhesive pads 5 and 4 in lead frame positions C1 and C2. Note how free space 12 exists in lead frame 11 between the facing edges of each termination pair 3/2 for each pellet 1, and free space 13 exists in lead frame 11 between adjacent pellets 1. Referring also to FIGS. 7 and 8, there is free space around most of the perimeter of the anode and cathode terminations in lead frame 11. This allows plastic to be molded into those spaces.

4. Molding

Once the desired number of pellet/wire combinations 1/9 are placed on, adhered to, and supported by their adhesive pads for each termination pair (anode and cathode terminations) in the lead frame array 11 (usually filling up all positions on the array), with wires 9 aligned in the same direction for each pellet 1, encapsulating material 6 is applied over the array (see FIGS. 7 and 8). Part of the encapsulating material 6 is cut away in FIGS. 7 and 8 to show pellet/wire 1/9 combinations in position in the array of columns and rows on lead frame 11. Conventional, known-in-the-art machines and methods can be used to mold the encapsulating material around each pellet. It is usually a plastic that is applied in a liquid or semi-solid phase over lead frame 11. As indicated previously, the pre-formed spaces around anode and cathode terminations in lead frame 11 allow the encapsulating material to flow around and into spaces 12 and 13 to essentially encapsulate pellets and embedded wires, as well as partially underneath the pellets. The encapsulating material also flows and hardens around the perimeter edges of the anode and cathode terminations, except of course, for the portions of their perimeter edges that are integral with the remainder of lead frame 11 (these will be separated from the lead frame during singulation).

The encapsulating material subsequently hardens into a solid phase layer over frame 11 essentially encapsulating the pellet/wire 1/9 combinations on lead frame 11. A variety of ways to mold the encapsulating material exists. One state-of-the-art method uses a commercially available machine. A tray holds the lead frame 11 (see also FIG. 17) and the adhered pellet/wire combinations in their generally evenly spaced apart positions on lead frame 11. The tray is inserted into the machine which applies or molds the plastic over the lead frame.

5. Marking

As is conventional, an anode polarity marking can be laser-applied, stamped, molded, or otherwise applied to the top of each capacitor 10. FIG. 1 shows diagrammatically the position of such a marking 8. The marking can be positioned at the anode end of the capacitor to visually inform a viewer of its location. It could include indicia, including words or symbols that specify, for example, a polarity bar and voltage code, such as are known in the art.

Because the position of each pellet is relatively precisely known in the array, the marking 8 could be applied to the top of the layer of encapsulating material for each column and row location during or right after molding by automated means.

6. Dicing/Singulation

Following standard automated or semi-automated fabrication techniques known in the art, dicing or singulation then occurs. Cutting occurs along predetermined separation lines to singulate each pellet/wire combination 1/9 from the continuous molded plastic layer (see, e.g., FIG. 7). Cutting parallel to the longitudinal axis of each of pellet 1 in between rows 1, 2, 3, etc., removes molded plastic from between adjacent sides of the pellets and creates generally planar vertical side walls. Cutting perpendicular to the longitudinal axis of each pellet between columns A, B, C, etc., removes molded plastic from between adjacent ends of the pellets creates generally planar vertical end walls. It is controlled to leave the distal end of wires 9 exposed (see FIGS. 9 and 10). The tops of cases 6 are also generally horizontally planar.

Also, the dicing or singulation step frees the anode and cathode termination pair 3/2 for each pellet 1 from lead frame 11, and the bottoms are generally horizontally planar with the bottom surfaces of the anode and cathode terminations exposed. This can be accomplished utilizing known in the art techniques and equipment so that each encapsulated pellet 1 can be singulated into the form shown in FIG. 9.

A commercially available machine would receive the lead frame with encapsulated array of pellets. With proper alignment and positioning, it would cut along the separation lines (several are illustrated in FIG. 7). Unneeded plastic material would be removed from between each array location. The separation steps produce a desired package or case size for each capacitor. They also expose the end of each wire 9. They can also expose the outer edges of anode termination 3 and cathode termination 2 at opposite ends of each case 6. Particularly note, in this process, the edge of anode termination 3 is exposed in or near the same vertical plane as the exposed end of wire 9.

Figure 9:
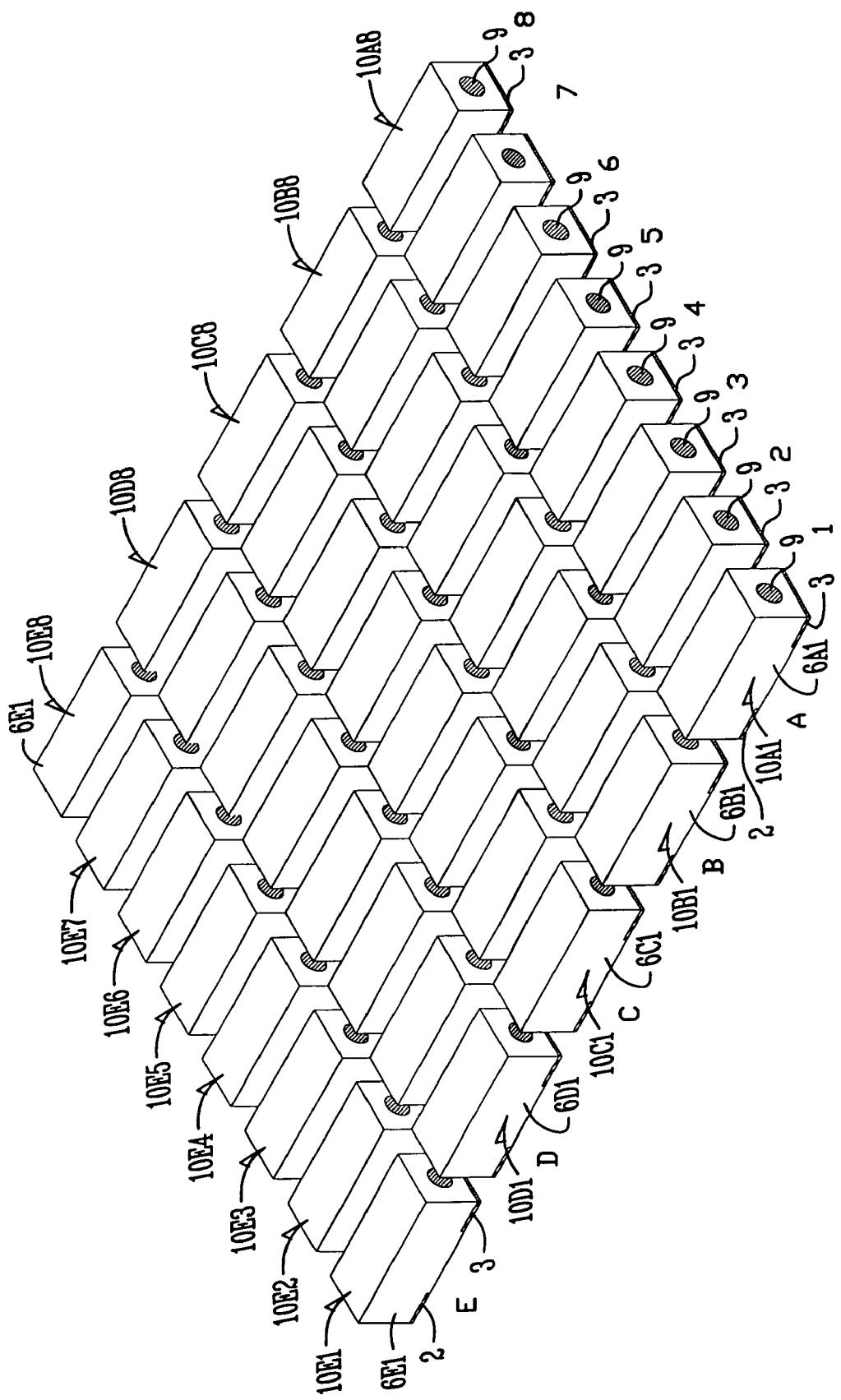
FIG. 9 is a perspective illustration of a subsequent singulation step for producing a plurality of partially completed capacitors from the molded array of FIG. 7.
Figure 10:
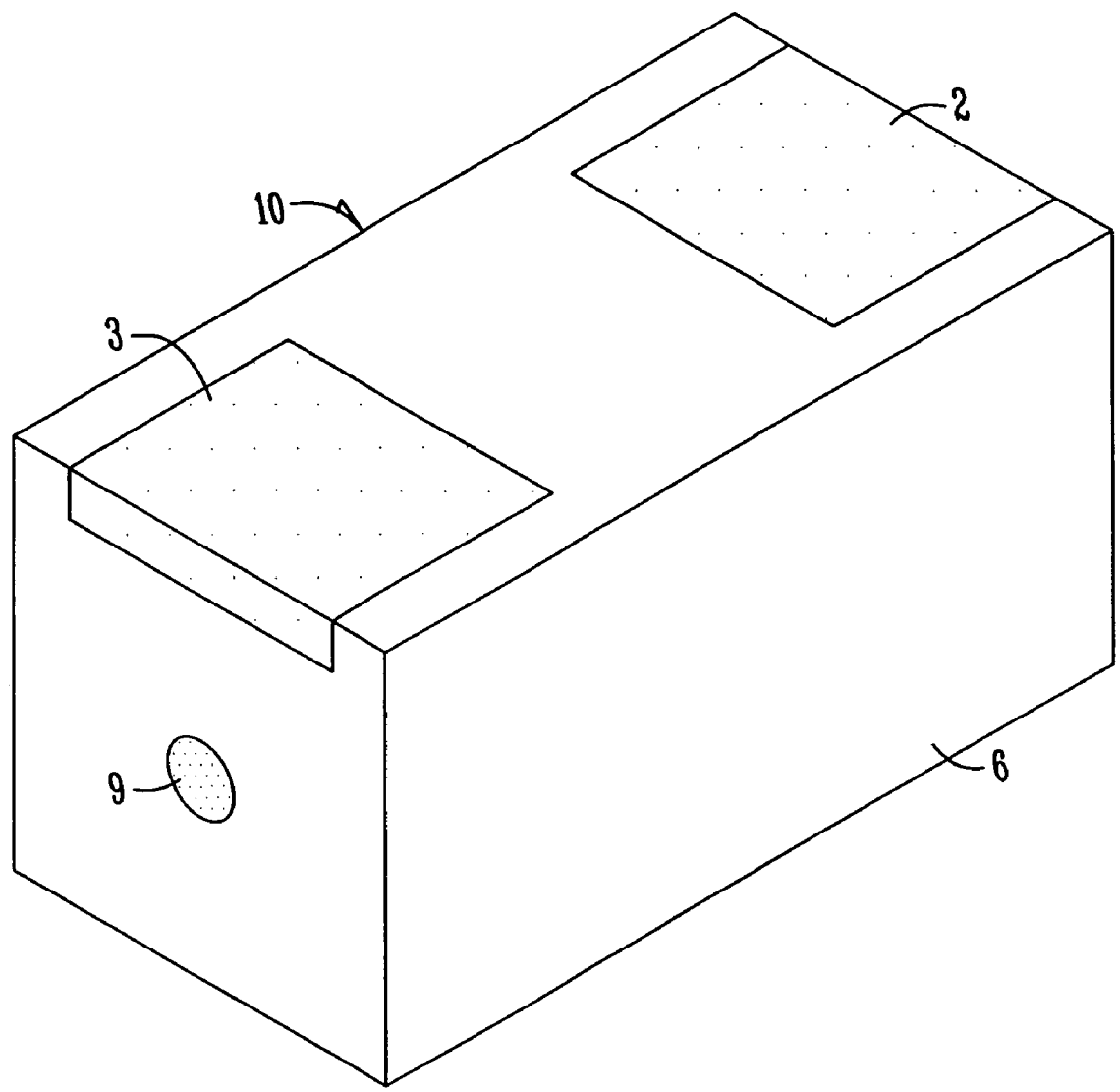
FIG. 10 illustrates, in isolation, an enlarged view of one of the partially completed capacitors of FIG. 9 but from a bottom perspective.
Figure 11:
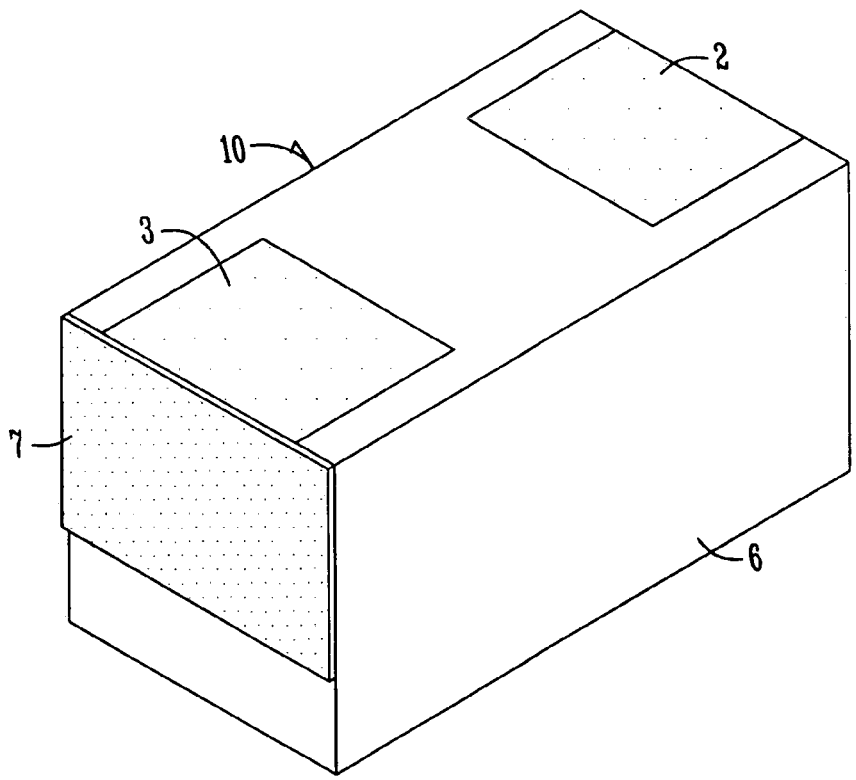
FIG. 11 is similar to FIG. 10 but shows a subsequent metal deposition or sputtering manufacturing step—adding an external conductive path at one end of the partially formed capacitor. This could also be done at both ends.
Figure 11A:
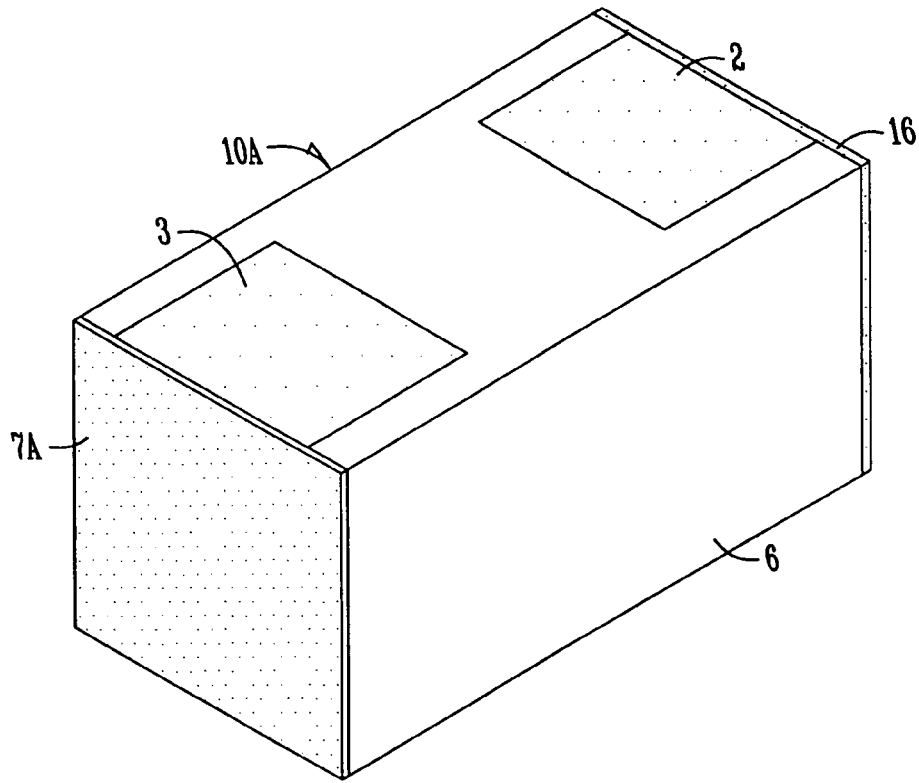
FIG. 11A is similar to FIG. 11 but with the alternative terminations of FIG. 1A.

As indicated in FIG. 9, the cutting steps result in the plurality of rows and columns of encapsulated pellets/wires, and corresponding wire and anode/cathode terminations sets, being separated from lead frame 11, as well as producing the basic form of case 6 and terminations 2 and 3. This singulated array is then ready for finishing steps to make complete capacitors 10.

7. Application of External Conductive Path

Also by methods and machines well-known in the art and commercially available, external conductive path 7 can then be applied to each singulated combination of FIG. 9. One technique is metal deposition. A controlled-in-size, relatively thin, metal layer would be deposited on and adhered to the anode termination end (and possibly also the cathode termination end) of each singulated encapsulated combination.

The path 7 would extend from completely covering the exposed end of wire 9 down to covering the exposed edge of anode termination 3 (see, e.g., FIGS. 3, 10, 11, 14, and 15). It can be a relatively thin layer (e.g. in the range of 10 Angstrom to 10 µm, preferably 0.01 µm-10 µm and more preferably 0.1 µm-5 µm thick), but sufficient to made a reliable electrical contact between wire 9 and the metal array which is used as the anode termination of the capacitor. In this embodiment, layer 7 does not extend to the top of case 6.

8. Plating

Figure 12:
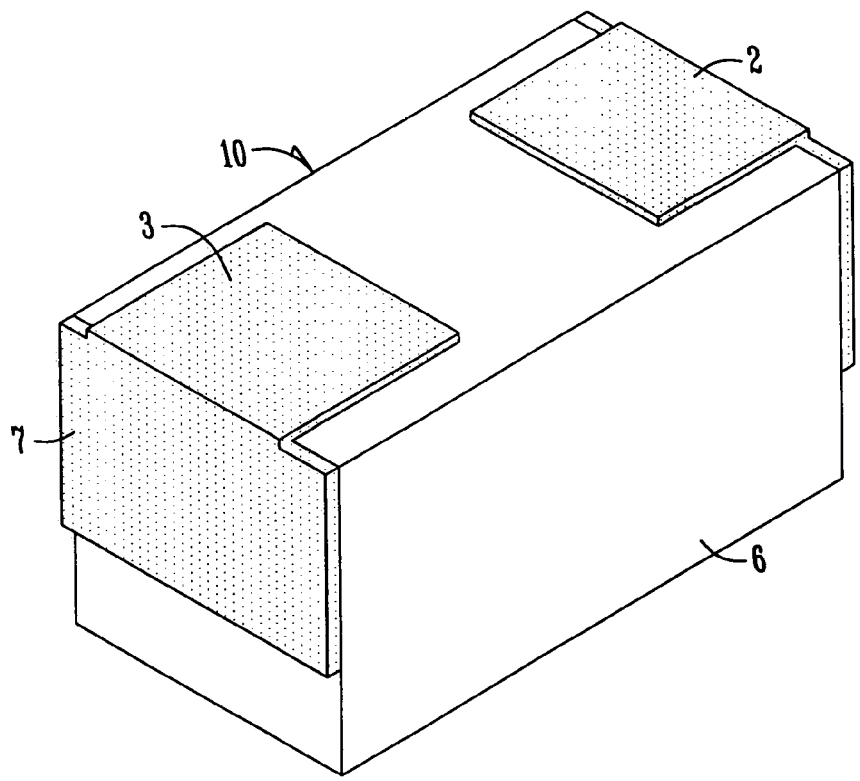
FIG. 12 is similar to FIG. 11 but illustrates a final manufacturing step for the capacitor—plating the external conductive path and the two bottom terminations.
Figure 12A:
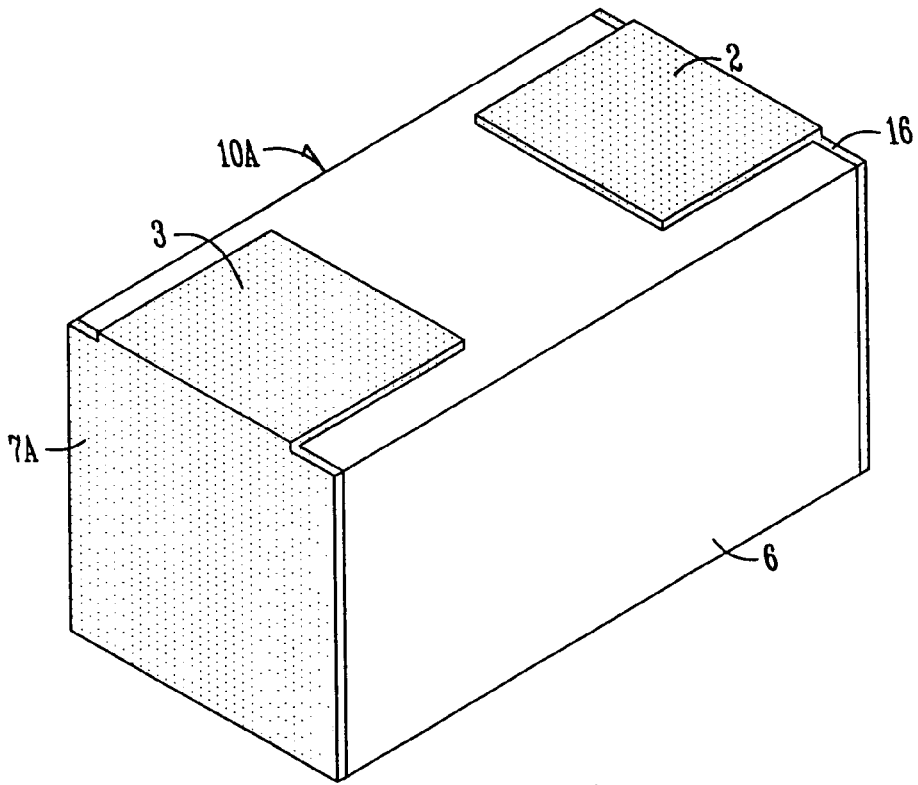
FIG. 12A is similar to FIG. 12 but with the alternative terminations of FIG. 1A.

In this exemplary embodiment, a conventional plating process is used to apply an electrically conductive plating (e.g. nickel, thickness 0.5 µm-20 µm, preferably 0.5 µm-3 µm, following by Pd or NiPd or Au or Sn or other standard metal plating in the thickness of 0.001 µm-10 µm, preferably 0.1 µm-5 µpm) to the outer surface of each of external conductive path 7, anode termination 3, and cathode termination 2 (see FIG. 12). This introduces some additional, but relatively small, thickness to those parts (see thickness $X_E$ in FIG. 14). This completes each capacitor 10. Thus, consecutive plating operations produce single-sided termination capacitors in relatively uniform case size.

Figure 2:
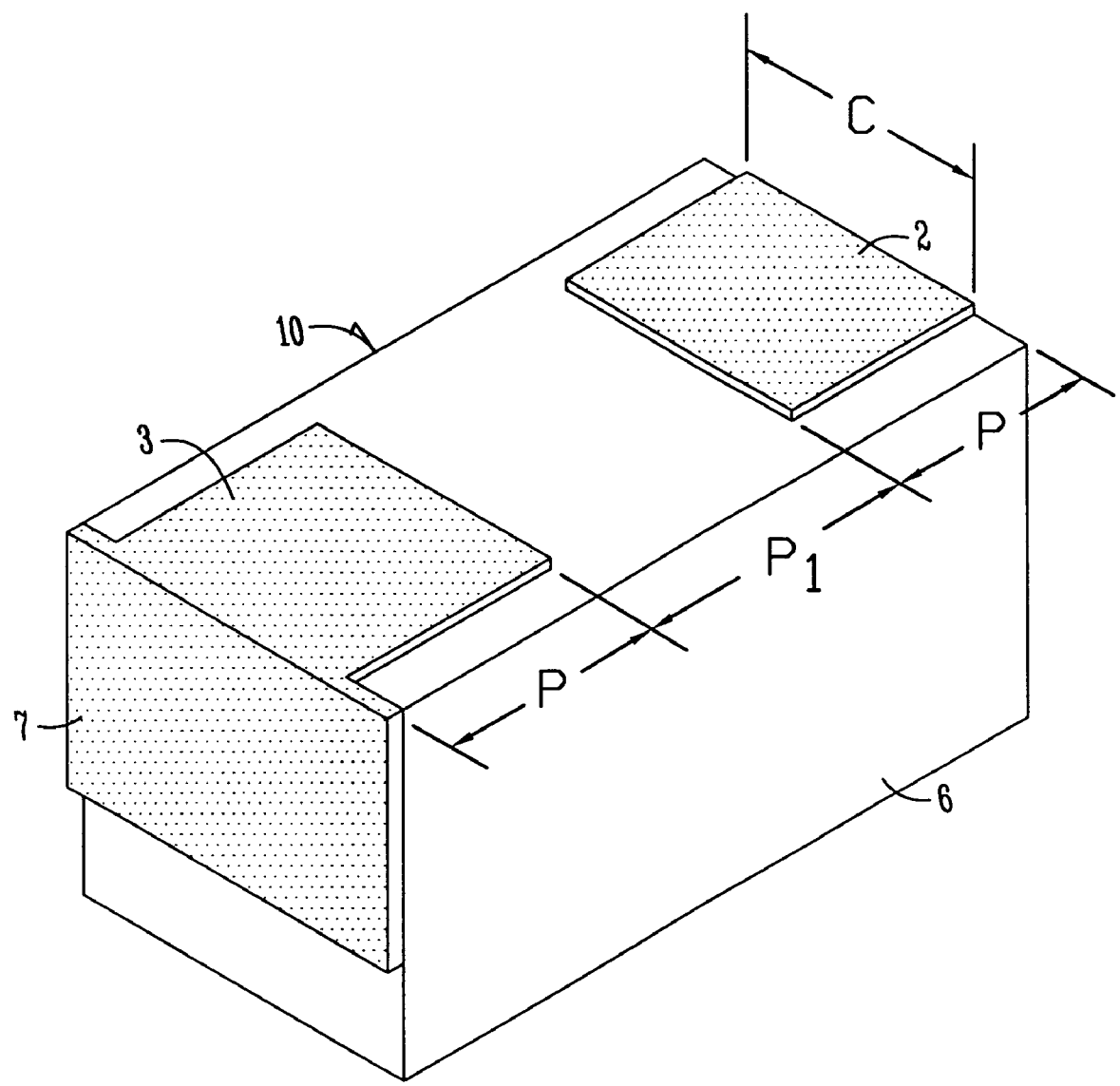
FIG. 2 is a perspective view of the capacitor of FIG. 1 but inverted to show its bottom surface and termination configurations on the ends of the case of the capacitor.
Figure 2A:
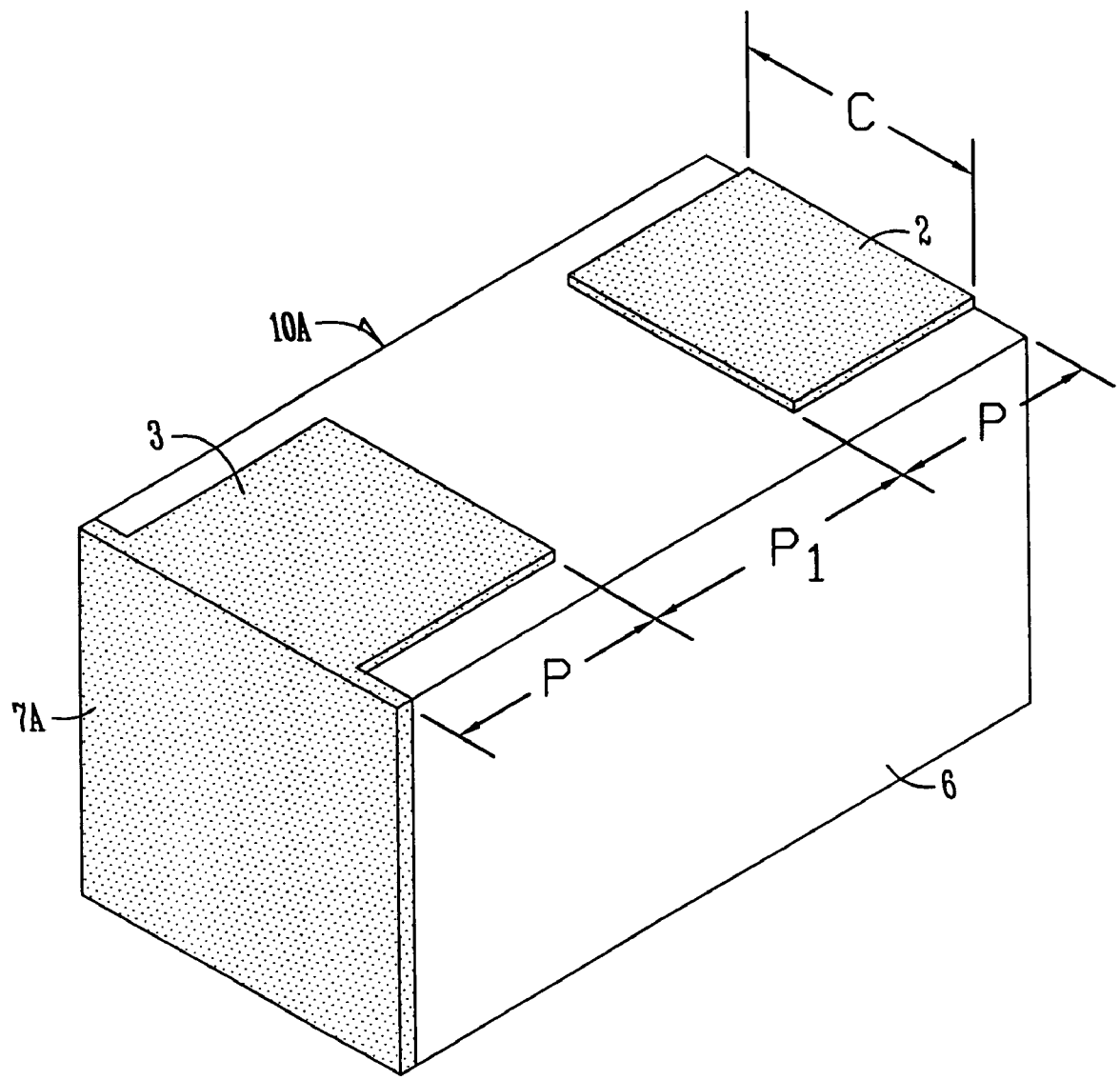
FIG. 2A is similar to FIG. 2 but with the alternative terminations of FIG. 1A.

The completed, singulated capacitor 10 has an anode termination width C and length P (see FIG. 2). The cathode termination has a similar width C and length P. A distance $P_1$ exists between adjacent edges of terminations 2 and 3 (see FIG. 2).

9. Testing and Packing

As is conventional, once the manufacturing steps outlined above are completed, capacitors 10 are tested for quality control and operation. Those passing inspection are packaged for shipment to an end user.

Thus, on a mass production scale, a plurality of individual capacitors 10 can be manufactured using conventional fabrication techniques. However, placing the electrical connection between wire 9 and anode termination 3 along the outside of case 6 frees up space inside case 6 to increase the size of pellet 1. Without changing case size, more capacitance capability is introduced. Thus, volumetric efficiency is increased.

It can therefore be seen how the exemplary embodiment achieves the stated objects, features, aspects, or advantages of the present invention. Capacitors 10 can be manufactured with well-known, developed techniques and machines. The manufacturing steps can be efficient in cost and resources. They can be easily implemented for a variety of case sizes.

D. Options and Alternatives

It will be appreciated that the foregoing exemplary embodiment and exemplary manufacturing method are but one way the invention can be practiced. They are presented for illustrative purposes only and not by way of limitation. Variations obvious to those skilled in the art are included with the invention.

For example, the invention is applicable to a variety of package or case sizes. It can be scaled up or down according to need. Package size of 0603 has been described above. However, feasibility of the process and product has not only been demonstrated by producing capacitors in 0603 (M case) size, but it is believed applicable to a wide range of, and possibly any, case size. It could potentially be extended to Low Profile case sizes. Some additional exemplary case sizes are 0402, 0603, 0805, and bigger sizes.

Capacitor 10 can be manufactured to at least standard tolerances in a variety of capacitance and other ratings, including relatively high power applications. It could be utilized for low profile conformal surface mount applications with high volumetric efficiency for energy storage, filtering, and by-pass. It could be utilized in microprocessor based systems. It can be advantageous for other higher frequency, single sided termination applications. These are but a few application examples.

The invention can be utilized for use with electrical or electronic devices of almost any type. Consumer, medical, and communication products are prime candidates for such capacitors. RF applications are also candidates. Some examples in communication and consumer segments are cell phones, personal digital assistants, and hand-held gaming devices. Medical field applications are also of high potential. The fields of application is not limited.

The precise type of capacitor can also vary. In the exemplary embodiment, capacitor 10 is a chip capacitor of the type having a tantalum slug or pellet which is sintered, formed and impregnated with manganese dioxide or conductive polymer. Wire 9 is tantalum wire. The outer surface of each pellet is covered with a cured silver paste that serves as a cathode electrode. However, other materials for the capacitive component can be used. The invention is not limited to tantalum pellets or slugs. Other materials, forms, and configurations for the capacitive component, as well as for the case 6 or other aspects of the capacitor are possible. Some alternative materials have been mentioned earlier.

The metal deposition process provides accurate placement of the external conductive path 7, and reliable electrical contact between anode wire 9 and metal under layer 11 (the metal array which is used as the anode termination of the capacitor). When the metal deposition step is completed, the external conductive path 7 does not extend all the way to the top plane of case 6 in the embodiment of FIGS. 1, 2, 3, 4, 10, 11, 12, and 14. However, an alternative exemplary embodiment of the invention is shown at FIGS. 1A, 2A, 3A, 4A, 11A, and 12A. They show a slightly different single-sided termination capacitor according to the present invention. Instead of just one L-shaped anode termination 3/7 (as shown in FIG. 2), L-shaped terminations exist on both ends of the capacitor (see in particular FIGS. 2A and 3A). Conductive surfaces cover most of the ends of the capacitor. These L-shaped terminations are useful for providing elevated strength of the solder joint to the printed circuit board (e.g. when a customer needs stronger adhesion of the capacitor to the board (PCB), by means of creating a large meniscus on both capacitor ends after Reflow soldering). However, since conductive parts of the termination do extend to or near the top plane of the capacitor, there is some risk of shorting between those terminations. Similar construction steps to those of the first described exemplary embodiment can be utilized to make this alternative embodiment, including the steps to increase volumetric efficiency inside the capacitor. Other shapes of the terminations are possible.

Another example of a prior art capacitor is illustrated at FIG. 16. Anode termination 3 and cathode termination 2 are of different configuration. They are both C-shaped in cross section, as opposed to the flat cathode termination 2 of FIG. 3 or the L-shaped anode terminations 3 of FIG. 3A and L-shaped anode and cathode terminations 3 and 2 of FIG. 3B. In FIG. 16 the top free ends of the C-shaped anode and cathode terminations conductively connect to the outside $MnO_2$ cathode layer and the top oxidized anode layer of wire 9 respectively (e.g. by conductive adhesive or otherwise). The bottom free ends form the single sided surface mount portions of anode and cathode terminations 3 and 2 on the bottom side of the case. The intermediate section of the C-shaped anode and cathode terminations extend along an exterior part of the end walls, of the case.

FIG. 17 illustrates another example of a lead frame and how capacitors of the type of capacitors 10 according to the invention can be mass produced efficiently.

Furthermore, other methods can be used to improve volumetric efficiency for single sided termination capacitors. For example, advanced packaging technology (APT) can be used to reduce the thickness of the package or case walls to further increase capacitor volume utilization. Again, less case thickness frees up more space within a given case size for more pellet. Both array molding and segmenting operations could utilize high precision techniques that allow achieving thinner walls of plastic encapsulation. This, alone (and without the external conductive path 7), can increase volumetric efficiency of the capacitor by freeing up space for additional volume of the capacitive element or pellet.

But utilization of the external conductive path 7 and the above-discussed high precision manufacturing methods, can together result in a cumulative improvement of volumetric efficiency. Testing has given indications that improvements of on the order of 70%, or higher, improved volumetric efficiency may be possible for certain pellet material, namely tantalum, and certain package sizes. For example, there might be as much as 100% or more capacitance increase over molded chip designs (see FIG. 16) in D case size (based on 80KCV, 6V rating designs).

The exemplary method of producing capacitors 10 allows production of a variety of a small size and low profile case sizes using the same assembly line and same molding equipment. However, it is to be understood that creation of capacitors like capacitors 10 does not require the use of the manufacturing or fabrication techniques described earlier with the exemplary embodiments. Alternative methods are possible.

Each capacitor can be surface mounted according to known methodologies. The applicability of these capacitors extends to all uses of surface mount capacitors. A primary benefit of capacitor 10 is the ability to have either smaller size for the same or greater capacitance or have a greater amount of capacitance for a similar sized case. Volumetric efficiency increase provides a significant advantage for many applications.

What is claimed is:

1. A method of manufacturing a surface mount capacitor comprising a capacitive element having an anode and cathode encapsulated within a case comprising:
    a) supporting the capacitive element on anode and cathode terminations by electrically conductive adhesive between the cathode termination and the capacitive element cathode and electrically insulating material between the anode termination and the capacitive element;
    b) placing encapsulating material around the capacitive element and portions of the anode and cathode terminations;
    c) shaping the encapsulating material to form a case around the capacitive element and portions of the anode and cathode terminations, leaving exposed a portion of the capacitive element anode at a surface of the case, the case having a top side and a bottom side including at least surface mounting portions of the anode and cathode terminations; and
    d) electrically communicating the exposed portion of the capacitive element anode and the anode termination at least in part externally of the case, wherein the electrical communication of the capacitive element anode and the anode termination comprises an external conductive path positioned on the surface of the case.

2. The method of claim 1 wherein the external conductive path is relatively thin.

3. The method of claim 1 wherein the external conductive path is a thin layer.

4. The method of claim 1 wherein the case has a case size, and the size of the capacitive element relative to volume of the case is increased over a capacitor which electrically communicates capacitive element anode and anode termination through the case to improve volumetric efficiency of the capacitor.

5. The method of claim 4 wherein volumetric efficiency is further improved by reducing case thickness relative size of capacitive element.

6. The method of claim 5 wherein case thickness is reduced by using high precision molding and case shaping techniques.

7. The method of claim 1 wherein the capacitive element comprises a solid pellet with an embedded or welded wire.

8. The method of claim 1 wherein the external conductive path is created by metal deposition.

9. The method of claim 1 further comprising supporting a plurality of said capacitive elements in spaced apart positions.

10. A method of mass producing a plurality of surface mount capacitors comprising:
    a) supporting a plurality of capacitive elements on pre-formed anode and cathode terminations on a lead frame by pre-applied electrically conductive adhesive between each cathode termination and each corresponding capacitive element cathode and electrically insulating material between each anode termination and its corresponding capacitive element;
    b) placing encapsulating material around supported capacitive elements on the lead frame;
    c) singulating the capacitive elements from each other by removing encapsulating material to form a case at least substantially around each capacitive element and corresponding conductive adhesive, insulative adhesive, and portions of anode and cathode terminations, leaving exposed a portion of the capacitive element anode at a surface of each case, each case having a top side and a bottom side including the anode and cathode terminations; and
    d) applying an external conductive path adapted to electrically communicate the exposed portion of the capacitive element anode and the anode termination for each capacitive element.

11. The method of claim 10 wherein the singulating comprises high precision techniques to minimize case thickness.

12. The method of claim 10 wherein the placing of encapsulating material comprises high precision techniques to minimize case thickness relative the capacitive element.

13. The method of claim 10 wherein the external conductive path is formed by metal deposition.

14. The method of claim 13 wherein the metal deposition promotes reliable electrical contact between wire and anode termination but deters forming of any conductive material at the top side of the capacitor.

15. The method of claim 10 further comprising plating the external conductive path and the anode and cathode terminations with a conductive material.

* * * * *